United States Patent
Kestler et al.

(10) Patent No.: US 9,970,083 B2
(45) Date of Patent: May 15, 2018

(54) METHOD FOR PRODUCING A SHAPED BODY AND SHAPED BODY THAT CAN BE PRODUCED THEREBY

(71) Applicant: PLANSEE SE, Reutte (AT)

(72) Inventors: Heinrich Kestler, Lechaschau (AT); Bernhard Tabernig, Pflach (AT)

(73) Assignee: Plansee SE, Reutte (AT)

( * ) Notice: Subject to any disclaimer, the term of this patent is extended or adjusted under 35 U.S.C. 154(b) by 214 days.

(21) Appl. No.: 14/889,907

(22) PCT Filed: May 5, 2014

(86) PCT No.: PCT/AT2014/000105
§ 371 (c)(1),
(2) Date: Nov. 9, 2015

(87) PCT Pub. No.: WO2014/179822
PCT Pub. Date: Nov. 13, 2014

(65) Prior Publication Data
US 2016/0115571 A1  Apr. 28, 2016

(30) Foreign Application Priority Data
May 7, 2013  (AT) .......................... GM166/2013 U

(51) Int. Cl.
| C22C 27/04 | (2006.01) |
|---|---|
| B22F 1/00 | (2006.01) |
| B23K 26/00 | (2014.01) |
| B23K 15/00 | (2006.01) |
| B22F 3/105 | (2006.01) |
| B22F 5/10 | (2006.01) |
| B22F 3/11 | (2006.01) |
| B22F 3/26 | (2006.01) |
| B23K 26/342 | (2014.01) |
| B23K 103/08 | (2006.01) |

(52) U.S. Cl.
CPC ............ *C22C 27/04* (2013.01); *B22F 1/0003* (2013.01); *B22F 3/1055* (2013.01); *B22F 3/11* (2013.01); *B22F 3/26* (2013.01); *B22F 5/10* (2013.01); *B23K 15/0086* (2013.01); *B23K 15/0093* (2013.01); *B23K 26/0006* (2013.01); *B23K 26/342* (2015.10); *B22F 2207/17* (2013.01); *B22F 2998/10* (2013.01); *B22F 2999/00* (2013.01); *B23K 2203/08* (2013.01); *Y02P 10/295* (2015.11)

(58) Field of Classification Search
CPC ................ C22C 27/04; B23K 15/0086; B23K 15/0093; B23K 26/342; B23K 26/0006
See application file for complete search history.

(56) References Cited

U.S. PATENT DOCUMENTS

| 5,126,102 A | 6/1992 | Takahashi et al. |
|---|---|---|
| 2004/0009088 A1 | 1/2004 | Glatzle et al. |
| 2004/0081573 A1 | 4/2004 | Newell |
| 2012/0202087 A1 | 8/2012 | Bampton |

FOREIGN PATENT DOCUMENTS

| AT | 5837 U1 | 12/2002 | |
|---|---|---|---|
| DE | 19909882 A1 | 9/2000 | |
| EP | 0446934 A2 | 9/1991 | |
| EP | 2 484 465 A1 * | 8/2012 | ............. B22F 3/105 |
| EP | 2484465 A1 | 8/2012 | |
| JP | 2001152204 A | 6/2001 | |

OTHER PUBLICATIONS

Li, Ruidi et al., "316L Stainless Steel with Gradient Porosity Fabricated by Selective Laser Melting" Journal of Materials Engineering and Performance, 2010, pp. 666, vol. 19(5).
Stoffregen, et al., "Selective Laser Melting of Porous Structures", Solid Freeform Fabrication Symposium, Austin, Texas, 2011, p. 680.
Byskov, J.S., et al., "Additive manufacturing of porous metal components", Fraunhofer Direct Digital Manufacturing Conference, Berlin, Germany, 2012.

* cited by examiner

*Primary Examiner* — Robert Harlan
(74) *Attorney, Agent, or Firm* — Laurence A. Greenberg; Werner H. Stemer; Ralph E. Locher

(57) ABSTRACT

A method for producing a shaped body from a metallic infiltrated composite, includes a first step in which a shaped body framework, some regions of which have an open pore framework structure, is produced from a powder or from a powder mixture having a primary component of a first metal or of a first metal alloy, in that the powder or the powder mixture is applied in layers, at least partially locally melted at predefined sites by a selective beam melting method and binds together upon solidification. In a second step, the shaped body framework is infiltrated with a melt of a second metal or metal alloy which melts at a lower temperature than the first metal or metal alloy.

11 Claims, 4 Drawing Sheets

METHOD FOR PRODUCING A SHAPED BODY AND SHAPED BODY THAT CAN BE PRODUCED THEREBY

BACKGROUND OF THE INVENTION

Field of the Invention

The invention relates to a process for producing a shaped body from an infiltrated composite and to a shaped body producible thereby.

Metal-matrix composites (MMCs) are composite materials consisting of a coherent matrix of metal or an alloy, into which a ceramic, organic or metallic secondary component has been introduced. If the secondary component forms a predominantly coherent structure, this is referred to as an infiltrated composite. Such infiltrated composites are the topic of the present invention.

Such materials are employed, for example, for thermal management functions in electronics, where materials for heatsinks are required, which feature high thermal conductivity and have thermal expansion properties matched to the heat-generating component. For this purpose, it is possible to use metal-matrix composites composed of tungsten-copper or molybdenum-copper, where the low thermal expansion of tungsten or molybdenum is combined with the good thermal conductivity of copper in one material. The thermal expansion of the material can be adjusted via the proportion by volume of the two components.

A further use example of metallic metal-matrix composites is that of materials which find use for contact connection in high-voltage switches. These contact materials have to have a low tendency to fuse for safe functioning of high-voltage switch contacts on the one hand, but at the same time good weld- and solderability for processing reasons on the other hand. For this application too, a composite material based on tungsten and copper is used. In this use example, it is the hardness, wear resistance and flash resistance of tungsten which is combined with the good thermal and electrical conductivity of copper.

An important aim and challenge in the production of materials is the local optimization of the material. A first step in the direction of locally optimized materials is that of functionally graded materials (FGM), which are composite materials in which the properties gradually change in a virtually continuous manner in at least one direction. The material may have a gradient in the chemical composition of a phase, a gradient in the proportion by volume of a phase or, in the case of material produced by powder metallurgy, a gradient in the porosity or pore size of a phase.

For graded or locally optimized composite materials, essentially two classes of production method are known from the prior art: one-stage methods such as coating methods or direct sintering of powder mixtures having different composition and/or morphology, and two-stage methods in which a porous shaped body is produced in a first step and is infiltrated with a lower-melting component in a second process step. The porous shaped body can be manufactured directly, for example by means of conventional powder metallurgy methods or chemical or physical deposition methods, or indirectly, for example by means of sintering with the aid of additives and subsequent debindering. The graded structure can be created by variation of the powder size used.

What is common to these methods known from the prior art is that the shaped body is constructed layer by layer, and controlled gradation of the material properties is possible only in the direction of material construction. It is additionally impossible to limit gradation locally to a defined volume in the material. The known methods are imprecise and unsuitable for local optimizations of the material on a size scale in the mm range. It is additionally impossible to manufacture near-net-shape shaped bodies.

One possible solution for production of a near-net-shape shaped composite body is proposed in US20040081573. US20040081573 describes a process for producing a metal-matrix composite, in which a porous shaped body is produced in a first step by selective laser sintering (SLS) and is infiltrated in a subsequent step with a lower-melting component. Although the shaped body produced by selective laser sintering features a near-net-shape geometry and a high green strength, the process is very complex because of the necessity of organic and inorganic additives and of an additional debindering step. The manufacture of a graded material or locally optimized material is not addressed in US20040081573. Direct manufacture of a porous shaped body by means of selective laser sintering without the thermal debindering step is not very suitable for industrial mass production because of the long process duration required for the consolidation of the structure (i.e. formation of sinter necks).

It is also known from the current literature that selective laser melting (SLM), in which the powder is heated locally to melting temperature by means of a laser beam and melted, can be used for the manufacture of porous structures having complex geometry (Stoffregen, et al., "Selective Laser Melting of Porous Structures", Solid Freeform Fabrication Symposium, Austin, Tex., (2011), p. 680), for manufacture of a porosity gradient in stainless steel (Li, Ruidi et al., "316L Stainless Steel with Gradient Porosity Fabricated by Selective Laser Melting" Journal of Materials Engineering and Performance, vol. 19(5), (2010) p. 666) and for the manufacture of a porous shaped body (Jeppe Byskov et al., "Additive Manufacturing of Porous Metal Components" Fraunhofer Direct Digital Manufacturing Conference, Berlin (2012)). The use of SLM for production of a metallic infiltrated material was not addressed by any of these authors.

BRIEF SUMMARY OF THE INVENTION

It is an object of the invention to provide a production process which is easily manageable in terms of process technology for a metallic shaped body, in which material properties can be locally optimized as required, and graded structures can especially be produced. The process of the invention shall additionally enable the production of a complex near-net-shape shaped body and also be suitable for the processing of relatively high-melting metallic materials.

This object is achieved by a process for producing a shaped body from a metallic infiltrated composite. A shaped body formed from an infiltrated material having locally adjustable material properties or graded structures is the subject of further independent claims.

The basic idea of the process of the invention is to use a selective beam melting method, for example selective laser melting (SLM) or selective electron beam melting (EBM), for layer by layer production of a metallic shaped body framework having an open-pore framework structure at least in some regions and then to infiltrate this shaped body framework with a lower-melting metallic component. The shaped body framework which is porous at least in some regions is constructed layer by layer from a metallic powder of a first metal or a first alloy or from a metallic powder mixture having a primary component (at least 50 percent by weight) composed of a first metal or first alloy. For this purpose, the powder or powder mixture is applied in a layer without addition of organic binders or fluxes, is at least partly melted selectively at predetermined sites by means of a beam conducted over the powder layer, which introduces energy locally into the powder layer, for example a laser or electron beam, and solidifies. The porosity and net shape of the framework structure of the shaped body is set by appropriate guiding of the laser or electron beam. The shaped body framework which is porous at least in some regions and has been produced in this way is subsequently infiltrated with a melt of a second metal or a second alloy having a lower melting point compared to the first metal or first alloy. By varying the porosity or pore size of the framework structure of the shaped body and hence the proportion of the infiltrant over the volume of the shaped body, it is possible to produce a shaped body having locally optimized properties, for example graded structures in any desired direction, not just in the direction of the layer by layer construction.

The starting point for the framework structure of the shaped body is a powder composed of a metal, a metal alloy or a powder mixture having a primary component composed of a metal or an alloy. The powder or powder mixture preferably consists at least of 50 percent by weight of an element of transition group 4 (titanium, zirconium, hafnium), of transition group 5 (vanadium, niobium, tantalum), of an element of transition group 6 (chromium, molybdenum, tungsten) or of rhenium.

In a preferred working example, it is possible to add a suitable metallic addition which lowers the interfacial tension between the framework structure and the infiltrated melt to the powder or powder mixture. This addition improves the wettability of the shaped body framework with the infiltrated melt and hence enables production of a denser infiltrated composite. For example, in the case of an infiltrated composite based on tungsten-copper or molybdenum-copper, it is possible to add nickel to the tungsten or molybdenum powder used for formation of the framework structure. The addition of nickel improves the wettability of the copper melt with the framework structure of tungsten or molybdenum.

In a further working example, in order to increase the proportion by volume of the second component in the composite, the powder or the powder mixture from which the framework structure of the shaped body is formed may also have proportions of the second metal or the second alloy with which the shaped body is infiltrated. In the example of the infiltrated composite composed of tungsten-copper, this means that the starting powder for the formation of the framework structure, as well as tungsten, may also include proportions of copper. The proportion of the second component in the powder or the powder mixture for the framework structure should be matched here to the desired proportion by volume of this component in the composite. However, it should be ensured that the higher-melting component forms a sufficiently coherent network which remains stable when the shaped body is subsequently infiltrated with the melt and a portion of the framework structure melts or softens. Because of this requirement, the proportion of the second metal or the second alloy in the starting powder for the framework structure is generally not more than 30 percent by volume.

According to the invention, there is no need to add any organic binders or organic fluxes to the powder or the powder mixture.

For formation of the framework structure of the shaped body, the powder to be processed is applied in a thin layer to a vertically movable base plate. The powder layer is scanned in horizontal direction by means of a focused laser beam, electron beam or another suitable focusable heat source and heated locally at those points where the powder is to be solidified. The energy which is supplied by the laser or electron beam at selected positions is absorbed by the powder and is chosen so as to result in locally restricted melting of powder particles, where individual powder particles may be melted completely or only partially. It is sufficient if the powder particles are melted only at contact sites. On solidification, the particles which have been melted entirely or partly at contact sites form a solidified, coherent framework structure having a predominantly open-pore structure.

The porosity and net shape of the shaped body framework is established by appropriate guiding of the laser or electron beam. The laser or electron beam can be steered over the powder layer by means of suitable optics known from the prior art. The data for the guiding of the laser or electron beam, scan rate, exposure pattern and radiation intensity are determined in advance by software from the desired 3-dimensional shape and the desired porosity or pore size distribution of the framework structure of the shaped body.

If the powder consists of an alloy or of a mixture of two or more constituents having a different melting point, the first constituent to melt is that having the lower melting point and constituents having a higher melting point melt only with a delay or possibly not at all if the introduction of heat does not result in attainment of the melting temperature. It is therefore advantageous when the melting temperatures of the individual constituents are not all that different. For formation of a consolidated framework structure, it is not necessary that all the constituents of the powder are melted; instead, it is sufficient if the lower-melting constituent is at least partly melted and forms a coherent framework structure on solidification, into which powder particles having a higher melting point may be embedded.

The porous shaped body framework having the desired net shape and predetermined porosity is constructed layer by layer. After completion of one layer, the base plate is lowered by the magnitude of one layer thickness and another powder layer is applied, which is consolidated at the desired sites. This cycle is repeated until the shaped body framework having the desired framework structure is complete.

This process for production of the porous shaped body framework can be conducted in a suitable atmosphere, for example under reduced pressure or in an inert gas atmosphere such as an argon and/or helium atmosphere.

The layer by layer production of the porous shaped body framework is followed by infiltration with a melt of a second metal or a second metal alloy having a lower melting point than the main constituent of the shaped body framework. The infiltration can be effected, for example, by impregnating the shaped body framework in a melt or by means of gas pressure infiltration. For a dense solid and hence a material that can be infiltrated efficiently by the infiltrant, the framework structure of the shaped body is to be predominantly open-pore and the melt is to efficiently wet the porous shaped body framework. In one working example, the melt has an addition to improve the wettability.

It is a feature of the process of the invention that the porosity of the framework structure and hence the proportion by volume of the infiltrant can be varied in all 3 spatial directions in a very flexible but well-controllable manner, and not just in the direction of the layer by layer construction as known from the prior art. It is additionally an extremely economically viable process suitable for industrial production; in contrast to the sintering or spraying methods mentioned in the introduction, controlled alteration of the porosity does not require a change in the powder morphology which is difficult from a process technology point of view, such as in the particle shape, particle size or particle distribution.

A further crucial advantage of the process of the invention is that the porous shaped body framework obtained by the beam melting method has sufficient mechanical stability, such that, in the subsequent infiltration, barely any warpage or shrinkage occurs and therefore a high dimensional and shape accuracy of the shaped body is achievable. If required, the shaped body obtained virtually without shrinkage can be reprocessed after the infiltration.

In a preferred variant embodiment, the base and the outer walls of the porous shaped body framework are configured so as to be impervious in the construction, as a result of which no further mold is required for the infiltration step.

With the aid of the process, it is possible to produce shaped bodies having a gradient in the chemical composition in one, two or three spatial directions at least in a partial region. In this case, the change in the porosity or pore size of the framework structure and hence in the proportion by volume of the solidified infiltrated melt is essentially continuous or, as a result of the layer by layer processing, is stepwise in one or more spatial directions and it decreases or increases gradually over a certain range. For example, it is possible to manufacture shaped bodies having a radial gradient, in which the material properties change in radial direction.

The proportion by volume of the two components of the composite material is variable within wide ranges. The process according to the invention is particularly suitable for production of shaped bodies from a composite material, in which there may be regions in the shaped body having both a very high proportion, for example a proportion by volume of more than 90%, of a first component, with regions having a very low proportion by volume of the first component, for example a proportion by volume of between 10% and 20%.

These regions having different composition may additionally be in spatial proximity. For this purpose, in one variant of the invention, at least one recess having a geometrically predetermined form is formed in the course of formation of the shaped body framework, by not melting powder particles in the corresponding region and removing the loose powder particles after the production of the framework structure and prior to the infiltration with the melt. In order to be able to remove the loose powder particles, the recesses have to be accessible from the outside, meaning that the recesses extend as far as the surface of the framework structure and have a minimum size; in a preferred embodiment, the smallest extent of any recess in the framework structure in any direction is at least 50 µm, especially at least 100 µm, more preferably at least 1 mm.

According to one working example, the recesses in the framework structure are filled completely with the infiltrant in the subsequent infiltration step.

Alternatively, the recesses in the shaped body can remain unfilled or partly unfilled with the aid of molds or tools; in this case, the infiltrated shaped body itself has open recesses. For example, in the case of highly thermally stressed shaped bodies, non-infiltrated recesses in the form of holes may serve to accommodate a coolant.

It is a strength of the process of the invention that it is possible in a simple manner to produce shaped bodies in which these two modifications of the framework structure, namely formation of recesses having a geometrically predetermined form and variation of the porosity in at least one spatial direction, are combined.

By providing, in a spatial region in the framework structure of the shaped body, a multitude of recesses which take up a large proportion by volume and are filled with solidified melt, it is possible to achieve a higher effective proportion by volume of the infiltrated material component in this spatial region than has been possible to date by the methods known from the prior art. In the method known to date, there is an upper limit of about 50% in the proportion by volume of the infiltrated component. According to the invention, it is possible to provide, in a spatial region in the framework structure of the shaped body, for example, a multitude of elongated, especially cylindrical, pores arranged in a pattern. It is possible to provide a multitude of elongated, square, stacked recesses in order to form laminate-like structures at least in some regions in the framework structure of the shaped body. The recesses may be formed with a conical shape and narrow in one direction, in order to enable a more constant transition between the two material components.

The proportion by volume of the infiltrated material component, as described above, may additionally be increased by also using the infiltrant material for the construction of the shaped body framework.

The invention further relates to a shaped body composed of an infiltrated composite, which is produced by the above process steps or a suitable combination of the above process steps.

One way in which this shaped body differs from the shaped bodies known from the prior art is that the porosity of the framework structure changes locally in at least two spatial directions at least in a partial region. The framework structure forms a coherent two-dimensional network.

BRIEF DESCRIPTION OF THE SEVERAL VIEWS OF THE DRAWING

There follow detailed descriptions of three specific working examples of shaped bodies, with reference to the drawings FIG. 1 to FIG. 5 (working example 1.

DESCRIPTION OF THE INVENTION

In all three working examples, the shaped body (10, 20 or 30) has an approximately cuboidal outward shape, a small indentation having been made in the inner region in the top view. The shaped body consists of an infiltrated composite composed of two components, in which the proportion by volume of the first component, which forms a coherent framework structure, increases from a central region in discrete gradations in the outward radial direction, while the proportion by volume of the second component decreases correspondingly. Therefore, individual subregions arranged like onionskin (1, 2, 3 and 4) and having nearly identical chemical composition are formed, with the proportion by volume of the components changing from the inside outward. To simplify the illustration, a very coarse gradation into four subregions 1, 2, 3 and 4 has been undertaken in the working examples shown; in the case of appropriate guiding of the laser or electron beam, it is possible to achieve finer transitions up to and including a true gradation.

Working Example 1

Figure 1:
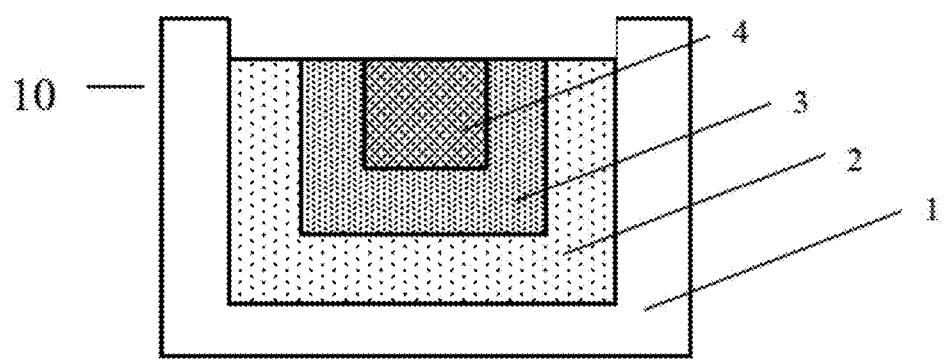
FIG. 1 to FIG. 3, working example 2.
Figure 2:
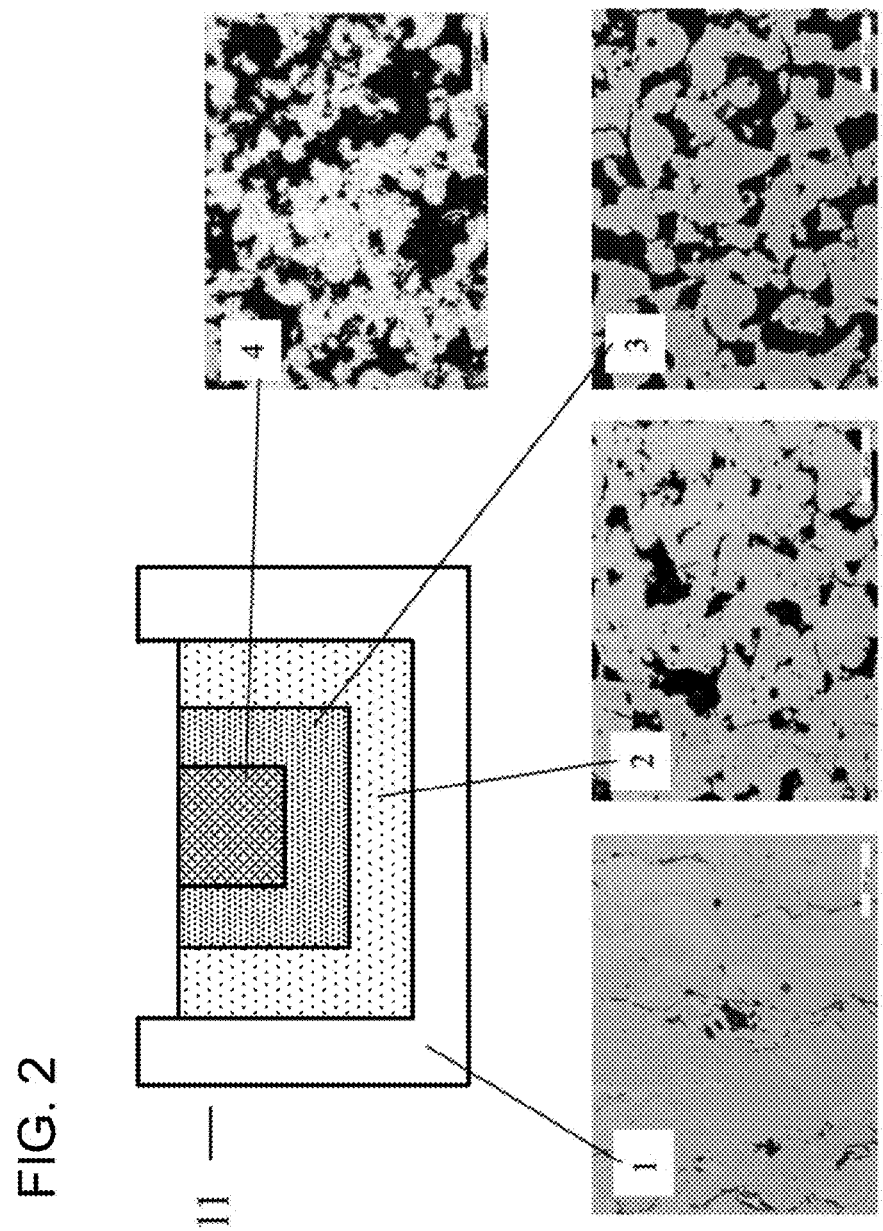
Figure 3:
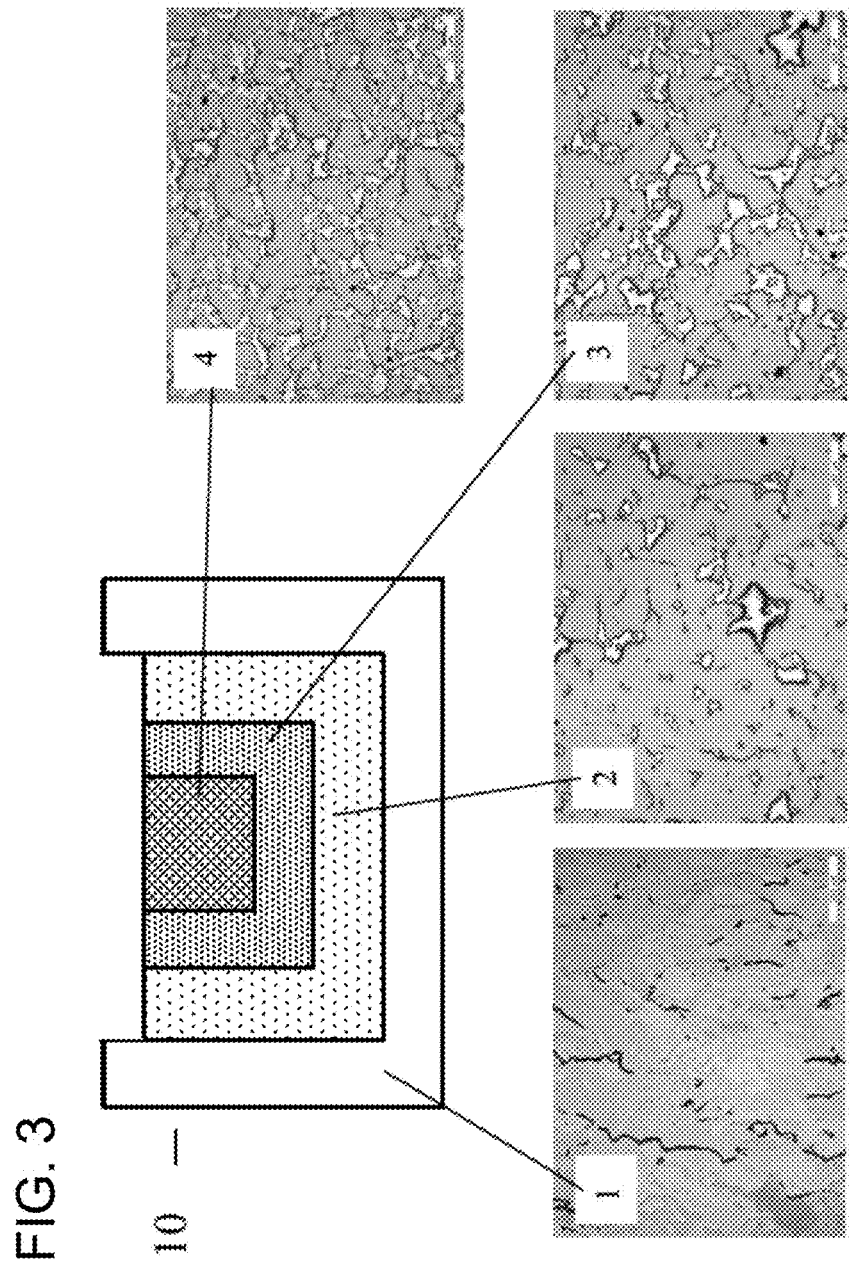

FIG. 1 shows a schematic cross-sectional side view of the shaped body of working example 1, the experimental realization of which is shown in FIG. 2 and FIG. 3.

FIG. 2 and FIG. 3 each show light microscope images of cross sections in the individual subregions 1 to 4, FIG. 2 showing a cross section through the shaped body framework (11) composed of tungsten prior to infiltration with copper, and FIG. 3 a cross section of the finished shaped body (10) after infiltration with copper.

The production of the framework structure from tungsten was effected under a protective argon gas atmosphere in a system for selective laser melting, in which a fiber laser operated in continuous mode with wavelength λ=1070 nm was used. Tungsten powder having a mean powder size of 20-50 µm and in spherical form was used. The tungsten framework structure (11) was constructed layer by layer on a lowerable construction plate: to form a layer, a coating bar was used to apply a homogeneous powder layer which was melted selectively with the laser beam in the individual subregions 1 to 4 with different process parameters. While the laser beam (focus value of about 50-200 µm) was guided over the sample with a virtually constant scan rate of about 400 mm/s in horizontal direction with a hatch distance (distance between exposure lines) of about 130 µm (irrespective of the individual subregions), the laser power was varied in the individual subregions: for the outer subregion 1 with the highest proportion by volume of tungsten, the laser power selected was 400 watts, 200 W was selected for subregion 2 and 150 W for subregion 3, and the laser power was reduced to 100 W for subregion 4. After completion of one layer, the construction plate was lowered by 30 µm and this process step was repeated in an iterative manner until the construction of the shaped body was complete. Subsequently, the tungsten shaped body framework was separated from the construction plate by means of wire erosion. FIG. 2 shows light microscope images of subregions 1 to 4 of a cross section through this as yet uninfiltrated shaped body framework (tungsten is in a grayish color; the pores are dark).

For infiltration with a copper melt, the tungsten shaped body framework was placed into a graphite crucible and introduced into a vacuum pressure sintering oven, in which the shaped body framework, under partial argon pressure (10 mbar), with an OFHC (oxygen-free high thermal conductivity) copper block placed on top, was heated to more than 1150° C. After a short hold time, the shaped body framework was infiltrated under high argon pressure of 50 bar. FIG. 3 shows light microscope images of subregions 1 to 4 of a cross section through the infiltrated WCu shaped body (10) (tungsten is in a grayish color; copper-infiltrated pores are light; closed unfilled pores are dark). While the outer subregion is formed from pure tungsten having a proportion by volume of about 95% by volume (no copper infiltrate penetrates because the pore structure is not open; these intermediate pores are dark), subregions 2 to 4 consist of a tungsten-copper composite (isolated unfilled closed pores are also present in the light microscope images). The proportion by volume of tungsten in subregion 2 is about 87% by volume, that in subregion 3 is about 79% by volume and that in subregion 4 is about 72% by volume.

Working Example 2

Figure 4:
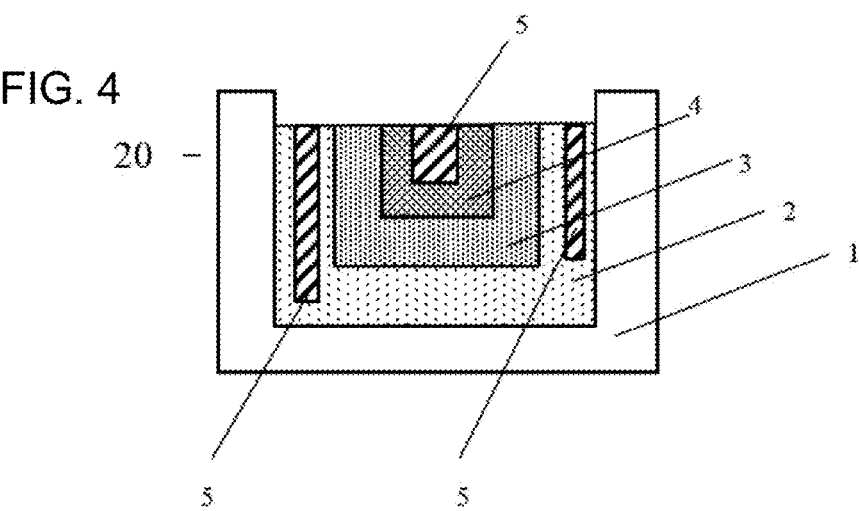
FIG. 4 and working example 3.

In working example 2 (FIG. 4), the shaped body (20) additionally also has copper-infiltrated recesses (a schematic cross-sectional side view of the shaped body is depicted). For this purpose, in the tungsten framework structure, recesses 5 having a diameter much greater than the average powder size of the tungsten powder have been sunk, in which the powder in these regions is not melted and the unmelted tungsten powder is removed from the recesses in the framework structure by means of compressed air prior to the gas pressure infiltration. The shaped body is cleaned in an ultrasound bath, dried in a drying cabinet and then infiltrated. The recesses are filled with copper.

Working Example 3

Figure 5:
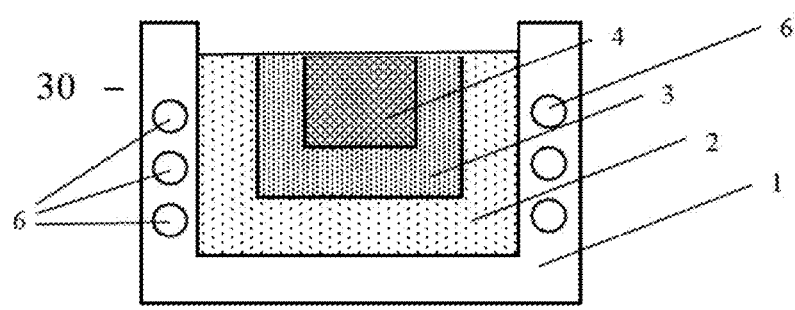
FIG. 5).

Working example 3 (FIG. 5) differs from working example 2 in that the recesses remain unfilled after the infiltration. For this purpose, by means of laser melting, the recesses (cooling channels) are provided in the impervious subregion 1 in which there is no open porosity and the infiltrate cannot penetrate.

The invention claimed is:

1. A process for producing a shaped body from a metallic infiltrated composite, the process comprising the following steps:
producing a shaped body framework having a predominantly open-pore framework structure at least in some regions from a powder or a powder mixture having a primary component composed of molybdenum or tungsten or a molybdenum or tungsten alloy, by constructing the shaped body framework layer by layer with superposed layers and forming each layer by applying the powder or powder mixture without an addition of organic binders or organic fluxes in a layer, at least partially locally melting the powder or powder mixture at predetermined sites by a selective beam melting method and solidification of the powder or powder mixture; and
infiltrating the shaped body framework with a melt of copper or a copper alloy having a lower melting temperature than the molybdenum or tungsten or the molybdenum or tungsten alloy.

2. The process according to claim 1, which further comprises adjusting a porosity or pore size of the framework structure by the selective beam melting method so as to be spatially different.

3. The process according to claim 1, which further comprises providing the shaped body with a chemical composition gradient in one or more than one spatial direction.

4. The process according to claim 1, which further comprises forming at least one recess having a geometrically predetermined shape in the framework structure by not melting powder particles in a corresponding region and removing loose powder particles from the framework structure after the production of the framework structure and prior to the infiltration with the melt.

5. The process according to claim 1, which further comprises forming at least one recess having a geometrically predetermined shape in the shaped body.

6. The process according to claim 1, wherein the second metal or second metal alloy has good thermal conductivity.

7. The process according to claim 1, wherein the selective beam melting method is selective laser melting or selective electron beam melting.

8. A shaped body formed from an infiltrated composite, the shaped body comprising:
an open-pore framework structure having at least a partial region composed of molybdenum or tungsten or a molybdenum or tungsten alloy, said framework structure having a porosity changing locally in at least two spatial directions; and
a solidified melt of copper or a copper alloy at least partly filling pores in said open-pore framework structure, said copper or copper alloy having a lower melting temperature than said molybdenum or tungsten or said molybdenum or tungsten alloy.

9. The shaped body according to claim 8, wherein said framework structure has recesses with a volume having a lowest extent in any direction of at least 100 μm.

10. The shaped body according to claim 8, wherein the shaped body has recesses with a volume having a lowest extent in any direction of at least 100 μm.

11. The shaped body according to claim 8, wherein at least part of the shaped body has a chemical composition with a two-dimensional gradient.

* * * * *